(12) United States Patent
Kapusta et al.

(10) Patent No.: US 8,035,073 B2
(45) Date of Patent: Oct. 11, 2011

(54) SWITCHED CAPACITOR INPUT STAGE FOR IMAGING FRONT-ENDS

(75) Inventors: Ronald A. Kapusta, Waltham, MA (US); Katsu Nakamura, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 498 days.

(21) Appl. No.: 12/277,679

(22) Filed: Nov. 25, 2008

(65) Prior Publication Data

US 2010/0127750 A1    May 27, 2010

(51) Int. Cl.
*H03F 3/08* (2006.01)
*H01L 27/00* (2006.01)
(52) U.S. Cl. .................. 250/214 A; 250/208.1
(58) Field of Classification Search ........... 250/208.1, 250/214 R, 214 A, 214 AG, 214.1; 348/245, 348/294, 300–311, 272, 281, 282; 257/431, 257/435, 443, 444, 290–292
See application file for complete search history.

(56) References Cited

U.S. PATENT DOCUMENTS

| | | | | |
|---|---|---|---|---|
| 4,941,051 A * | 7/1990 | Hicks | | 348/245 |
| 5,748,302 A * | 5/1998 | Unno | | 356/224 |
| 6,025,875 A | 2/2000 | Vu et al. | | |
| 7,268,338 B2 * | 9/2007 | Liu et al. | | 250/214 AG |
| 7,598,479 B2 * | 10/2009 | Nogami et al. | | 250/214 A |
| 7,667,176 B2 * | 2/2010 | Olsen et al. | | 250/208.1 |
| 2004/0090547 A1 | 5/2004 | Takeda | | |
| 2005/0018061 A1 | 1/2005 | Choi | | |

OTHER PUBLICATIONS

International Search Report dated Feb. 23, 2010, in counterpart international application No. PCT/US2009/065667.

* cited by examiner

*Primary Examiner* — Que T Le
*Assistant Examiner* — Pascal M Bui Pho
(74) *Attorney, Agent, or Firm* — Kenyon & Kenyon LLP

(57) ABSTRACT

Embodiments of the present invention provide an apparatus and control method for an analog front end (AFE) amplifier for controlling DC restore operations. According to the exemplary method, a first input stage of the AFE is controlled to operate as a continuous time amplifier that has high input impedance and draws substantially no input leakage current for a first predetermined area of an imaging sensor image array. The first input stage is controlled to operate as a sample and hold amplifier with DC restore functionality for a second predetermined area of the imaging sensor image array. According to an embodiment, the AFE input stage operates as a continuous time amplifier when reading pixels from the sensor's active image array but operates as a sample and hold amplifier with DC restore when reading pixels from the image array that correspond to so-called 'black-level' pixels or pixels that otherwise fall outside the sensor's active image field.

16 Claims, 4 Drawing Sheets

SWITCHED CAPACITOR INPUT STAGE FOR IMAGING FRONT-ENDS

BACKGROUND

The present invention relates to a switched capacitor input stage for an imaging front end. In particular, it relates to a circuit that can amplify signals from an image sensor and input the amplified signal into an analog front end circuit.

Analog front-ends (AFEs) for imaging systems have to interface with image sensors. In many applications, the image sensor output is capacitively coupled to the AFE input. The coupling capacitor can provide a voltage level-shift between the sensor and the AFE. This is particularly useful for coupling certain image sensors, such as CCD sensors, which might have a DC output voltage different from the allowable input compliance of the AFE.

The desired charge on the coupling capacitor must be established by performing, by the AFE, what is sometimes called a "DC restore". A DC restore circuit commonly includes a switch and a voltage source to recharge the coupling capacitor. The DC restore function can occur at various times depending on the image sensor. The DC restore circuit may only be active for certain pixels, for example 10-20, out of the 10,000 or more pixels in the image sensor pixel array. When the DC restore circuit is inactive, leakage currents off of the coupling capacitor can change the voltage at the capacitor. The leakage currents are often into the inputs of the AFE, and can cause image artifacts.

Typically, DC restore operations are performed when an output signal from the imaging sensor is maintained at a known value and the output signal does not carry image information. During pixel read out operations, image sensors conventionally perform precharge operations and other processes during which the sensor outputs settle to some stable reset or reference level, and AFE circuits often use this stable reference level to perform the DC restore operation. Image sensors are now being designed that do not provide a stable reference level during every pixel, therefore, a new interface between an image sensor and an AFE circuit is required.

DETAILED DESCRIPTION

Figure 1:
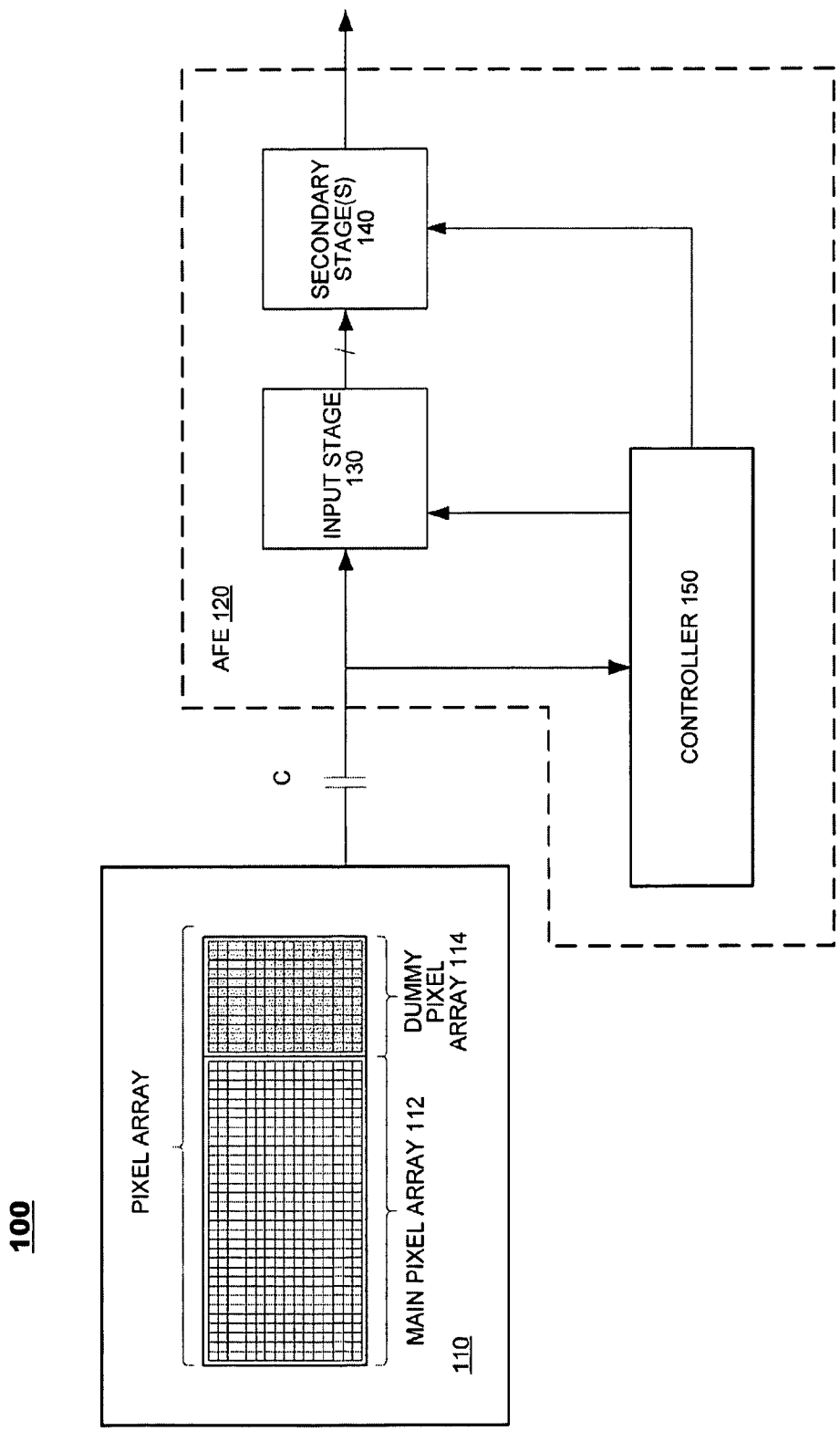
FIG. 1 illustrates a block diagram of the operation of a system according to an exemplary embodiment of the present invention.

Embodiments of the present invention provide a control method for an analog front end (AFE) amplifier for controlling DC restore operations. According to an exemplary embodiment input signals are received from an imaging circuit. It is determined whether the received input signals are first input signals or second input signals. The first input signals being different from the second input signals. When it is determined, the received input signal includes a first input signal, an amplification circuit is configured to a first configuration for providing a first mode of amplification. Otherwise, the amplification circuit is configured to a second configuration to provide a second mode of amplification.

According to another embodiment is a method for controlling amplification of signals read from an imaging circuit. Input signals are received at an input. It is determined whether the received signals at the input are first input signals or second input signals. The first input signal representing variations in pixel values from the imaging circuit and second input signals representing fixed pixel values from the imaging circuit. Based on a determination that the received signals are first input signals, multiple switches are actuated to a first configuration in response to a set of first control signals. Via a change from a first state of a first component to a second state, a signal is propagated representing the first input signals to an amplifier input, wherein the output of the amplifier is a continuous-time amplified signal. The output of the set of second control signals is based on the determination that the received signals are second input signals, and in response to a set of second control signals, the multiple switches are placed in a second configuration. The second input signals are held at the first component when the set of second control signals place the multiple switches in a second configuration.

Disclosed is an apparatus for providing amplification of data signals read from an imaging circuit. The apparatus includes means for receiving first input signal representing variations in the pixel values and second input signals representing fixed pixel values of an imaging circuit at an input. Embodiments of the apparatus include means for determining whether the received signals are first input signals or second input signals. The apparatus further includes means for outputting, based on a determination that the received signals are first input signals, a first control signal, wherein multiple switches are oriented in a first configuration in response to the first control signal. The apparatus also includes means for propagating via a change from an initial state of a first component a signal representing the first input signals to an amplifier input. Further included is means for placing the multiple switches in a second configuration in response to a second control signal, wherein output of the second control signal is based on the determination that the received signals are second input signals. The apparatus also includes means for holding the second input signals at a first component when the second control signal places the multiple switches in a second configuration. Also included in the apparatus is means for resetting the first component back to its initial state.

FIG. 1 illustrates a block diagram of the operation of a system according to an exemplary embodiment of the present invention. The system 100 comprises an imaging sensor chip 110, such as a charge-coupled device (CCD), and an analog front end (AFE) 120 coupled to an output of the imaging chip 110 via a coupling capacitor C. The AFE 120 may include an input stage 130, secondary stage(s) 140 and a controller 150. The imaging sensor 110 may include a pixel array comprising a main pixel array 112 and a dummy pixel array 114. The main pixel array 112 is made up of a plurality of pixels which are exposed to light in order to capture an image. The dummy pixel array 114 also is formed of a plurality of pixels but these pixels contain no image information. For example, the dummy pixel array 114 may include black-level pixels or other pixels that are otherwise obscured and do not receive incident light during operation. The image sensor 110 may output an analog signal to the coupling capacitor C in accordance with read operations performed on the pixels for the main image array 112 and the dummy array 114. For example, image data may be read from the image array in a raster scan order (row-by-row) in which the output signal alternately includes components from the main image array 112 and the dummy array 114. Herein, these components are called "main image data" and "dummy image data" respectively.

The AFE controller 150 is configured to determine whether the received input signal represents main image data or dummy image data. This determination can be made based on the data, timing of the data, clock signals, and other known methods. When the controller 150 determines that the input signal represents main image data, the controller 150 outputs control signals to the input stage 130. In response to the control signals, the input stage 130 operates as a continuous time amplifier, amplifies the input signal presented to it by capacitor and presents the amplified signal to a secondary stage(s) 140. When operating as a continuous-time amplifier, input stage 130 has a high input impedance. Therefore, no leakage current is drawn from the coupling capacitor C, or is input from the imaging circuit 110. Conversely, when the controller 150 determines that the input signal represents dummy image data, the controller 150 outputs control signals that causes switches in the input stage 130 to change to a second configuration. In the second configuration, the input stage 130 operates as a sample and hold amplifier and also performs DC restore operations. While operating as a sample and hold amplifier, input stage 130 may draw current from it's input. Because the DC restore circuit is operational during this time period, none of the input current is drawn from the coupling capacitor C but is instead supplied by the DC restore circuit. Therefore, there will be no image artifacts due to leakage current off of the coupling capacitor C, or from the imaging circuit 110.

Figure 2:
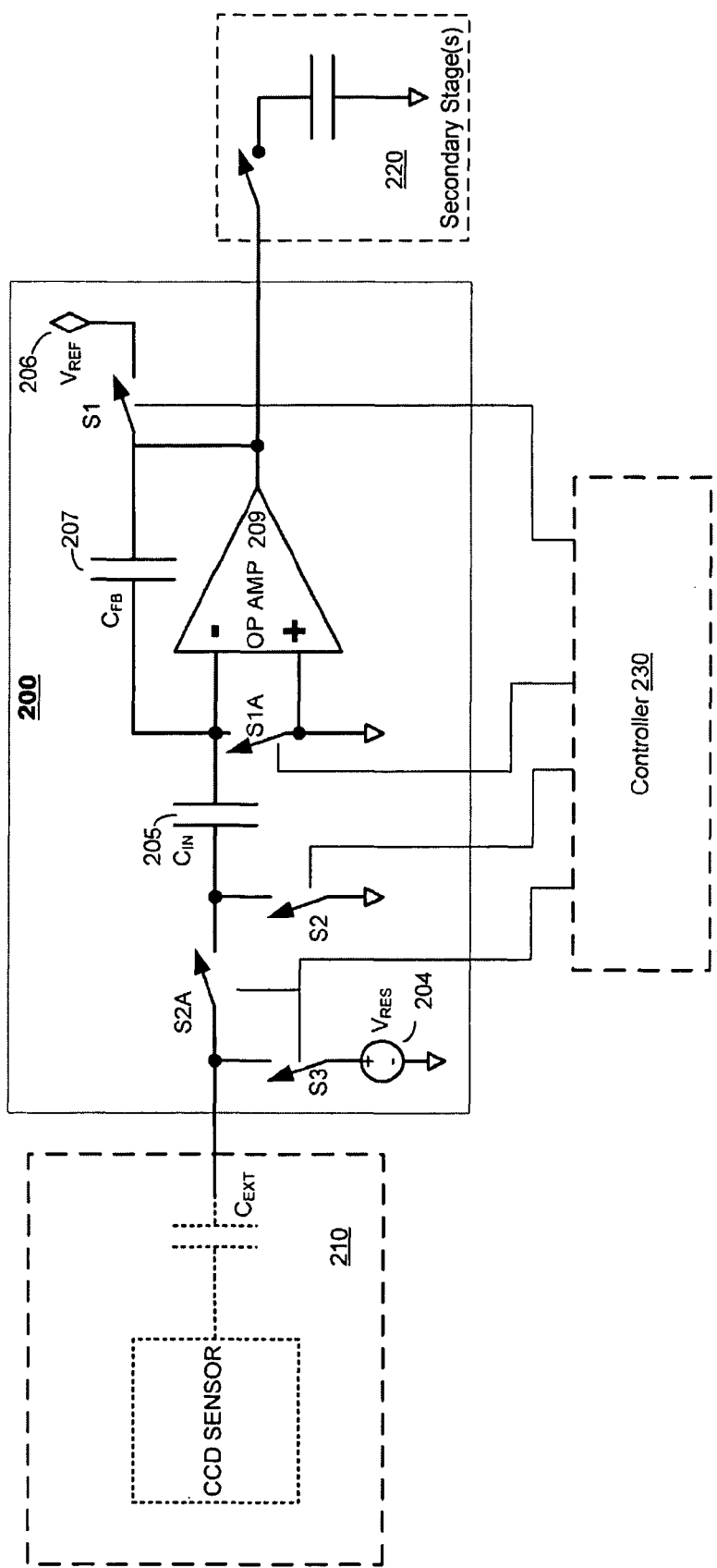
FIG. 2 illustrates further details of an exemplary apparatus according to an embodiment of the present invention.

FIG. 2 illustrates an exemplary input stage 200 according to an embodiment of the present invention. The input stage 200 can receive input signals from an image sensor 210, such as a CCD sensor, that passes from an external capacitor $C_{EXT}$. The input stage 200 can also output signals to secondary stage(s) 220. The input stage 200 is controlled by controller 230 according to the exemplary waveforms illustrated in FIG. 3.

Referring back to FIG. 2, the input stage 200 includes a DC restore voltage supply $V_{RES}$ 204, an input capacitor $C_{IN}$ 205, an operational amplifier 209 and a feedback capacitor $C_{FB}$ 207, all of which are switch controlled. A terminal of feedback capacitor $C_{FB}$ 207 is connected to the inverting input of the operational amplifier 209. A first terminal of the input capacitor $C_{IN}$ 205 is coupled to a first input of the operational amplifier 209. A switch S1A couples the input terminals of the operational amplifier 209 together. Another switch, labeled switch S1, couples reference voltage supply $V_{REF}$ 206 to another terminal of feedback capacitor $C_{FB}$ 207 at the output of operational amplifier 209. A switch S2 couples a second terminal of the input capacitor $C_{IN}$ 205 to ground. Another switch, labeled S2A, couples the second terminal of the input capacitor $C_{IN}$ 205 to the external capacitor $C_{EXT}$. Switches S2 and S2A operate in opposite fashion preferably in response to a common control signal. Although each may have a control signal dedicated to actuating each switch. A switch S3 couples a DC restore voltage supply $V_{RES}$ 204 to a node in the circuit path between switch S2A and the external capacitor $C_{EXT}$. The configuration of the operational amplifier 209 with capacitors $C_{IN}$ 205 and $C_{FB}$ 207 provides a gain according to the ratio of the value of $C_{IN}$ 205 to the value of $C_{FB}$ 207.

The input stage 200 can operate in either of two modes: a continuous time amplification mode or a sample and hold mode (also used as the DC restore mode).

In the continuous time amplification mode, all of switches S1, S1A, S2 and S3 are open and switch S2A is closed. Upon a determination by the controller 230 that image data, i.e., main image data, is being output from the image sensor 210, the controller 230 outputs the continuous time amplification waveforms Φ1, Φ2, $\overline{\Phi_2}$ and Φ3, such as those shown in FIG. 3, to control the operation of switches S1, S1A, S2, S2A and S3, respectively. Specifically, switches S1 and S1A respond to waveform Φ1, switch S2 responds to waveform Φ2, switch S2A responds to waveform $\overline{\Phi_2}$, and switch S3 responds to waveform Φ3. The external capacitor $C_{EXT}$ has been precharged to a fixed potential. The AC variations in the output from the CCD sensor propagate through the external capacitor $C_{EXT}$ from the image sensor 210 into the input stage 200, and to capacitor $C_{IN}$ 205. The charge on capacitor $C_{IN}$ 205 changes from a first state of charge to a second state of charge as the AC signal variations are received at $C_{IN}$ 205. The operational amplifier 209 drives the AC signal at $C_{IN}$ 205 to the output of the operational amplifier 209 with a gain determined by the ratio of the value of capacitor $C_{IN}$ 205 to the value of capacitor $C_{FB}$ 207. In this configuration, the input stage 200 has a high input impedance and does not effectively draw a substantial amount of input current.

The sample and hold mode may occur when the image sensor outputs data from pixel locations that are outside the main pixel array, such as the dummy pixel array 114. The sample and hold mode preferably occurs when a signal having a form shown in the DC restore period of waveform Φ3 of FIG. 3. The switches of the exemplary embodiments may be controlled according to the waveforms Φ1, Φ2, $\overline{\Phi_2}$ and Φ3 shown in FIG. 3. For example, waveform Φ1 controls the operation of switches S1 and S1A, waveform Φ2 controls switch S2, waveform $\overline{\Phi_2}$ controls switch S2A, and waveform Φ3 controls switch S3 of FIGS. 2 and 4.

In more detail, during a sample and hold cycle, a portion of the charge on capacitor $C_{EXT}$ in the image sensor 210 will pass to capacitor $C_{IN}$ 205 when switch S1A is actuated by control waveform Φ1, and then transfer to ground when switch S2 is actuated by control waveform Φ2. As the waveforms cycle, $C_{IN}$ 205 has to be charged again, resulting in a net input current being drawn off of capacitor $C_{EXT}$.

Figure 3:
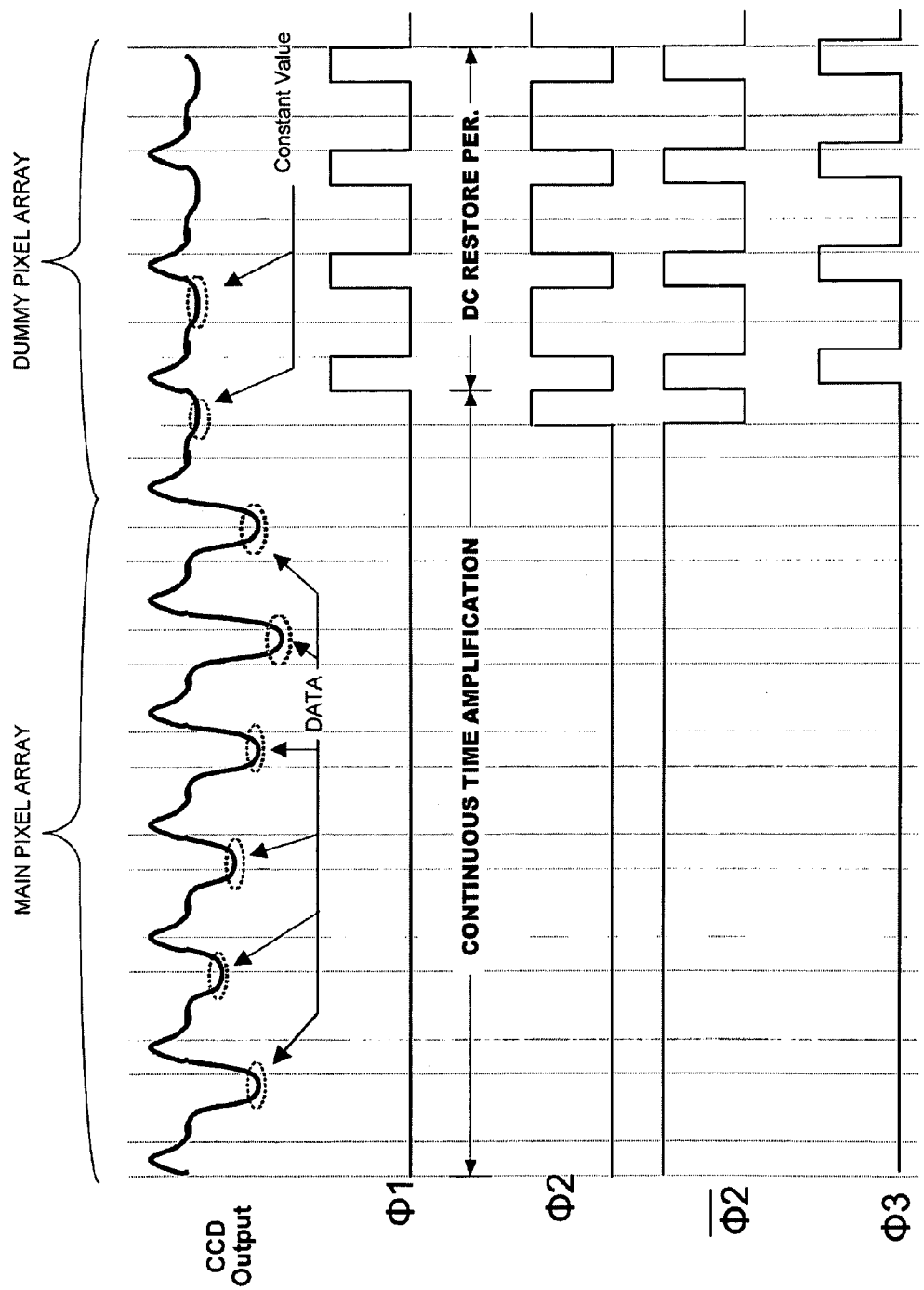
FIG. 3 illustrates exemplary waveforms for a charge-coupled device (CCD) sensor and control signals for control switches according to an embodiment of the present invention.

As shown in FIG. 3, the timing of the waveform Φ1 corresponds to the switching of switch S2, the actuation of which corresponds to the waveform Φ2. In the dummy pixel array 114, all of the pixels will settle to some known level corresponding to, for example, a black pixel (if shielded from light). Because all of the pixels are at a substantially constant level, the DC restore circuit is activated. When this occurs, in this example, the Φ3 clock (DC restore active) preferably has the same waveform as the Φ1 clock. Of course, any clock signal can also be used for the Φ3 clock signal so long as it causes the DC restore to be active. Due to the net current output from the CCD sensor, switches S2 and S1A and capacitor $C_{IN}$ 205 can be considered a composite switched-capacitor resistor. As with a resistor, the net current through it will be a function of the voltage applied across it, in this case, the voltage on $C_{EXT}$. The equivalent resistance is the product of $C_{IN}$ 205 and the frequency at which switches S2 and S1A are operating. In this way, the input stage 200 can be considered to have a finite switched-capacitor input impedance that draws non-zero current off of $C_{EXT}$.

In an initial state of a sample and hold operation, the charge from the CCD sensor is present on the capacitor $C_{EXT}$ of the image sensor 210. A charge is not present on capacitor $C_{IN}$ of the input stage 200. When switches S2A and S1 close, and charge on $C_{EXT}$ in the image sensor 210 transfers to $C_{IN}$ 205 in input stage 200. When switches S1 and S2A open and switch S2 closes, the charge on $C_{IN}$ 205 is transferred to CFB 207, and the operational amplifier 209 amplifies the input signal based on the ratio of $C_{IN}$ 205 to $C_{FB}$ 207.

The above cycle of continuous time amplification and a DC restore repeats as the CCD readout operation is performed. As the rows of pixels are readout from the pixel array, the DC restore function is NOT performed when image data, or main image data, is read out from the main pixel array.

The exemplary control waveforms are shown FIG. 3. The CCD output waveforms may not have plateaus when pixel data from the image sensor is readout from a main pixel array. The CCD output waveform may have a constant pixel data level during pixel readout from pixel locations outside the main pixel array, or, in other words, from the dummy pixel array. (See FIG. 1). Alternatively, when the system reads out pixel data from the main pixel array the pixel data level can vary. The control waveforms $\Phi 1$, $\Phi 2$, $\overline{\Phi_2}$ and $\Phi 3$ can have a consistent signal level during a continuous time amplification mode, which corresponds to pixels being readout from the main pixel array 112. While the control waveforms $\Phi 1$, $\Phi 2$, $\overline{\Phi_2}$ and $\Phi 3$ change more rapidly during a DC restore period, which corresponds to pixels being read out from the dummy pixel array 114. The illustration of control waveforms $\Phi 2$ and $\overline{\Phi_2}$ is presented for ease of understanding, it should be appreciated that a single control waveform can be output and the respective switches S2 and S2A can be configured to operate accordingly.

Figure 4:
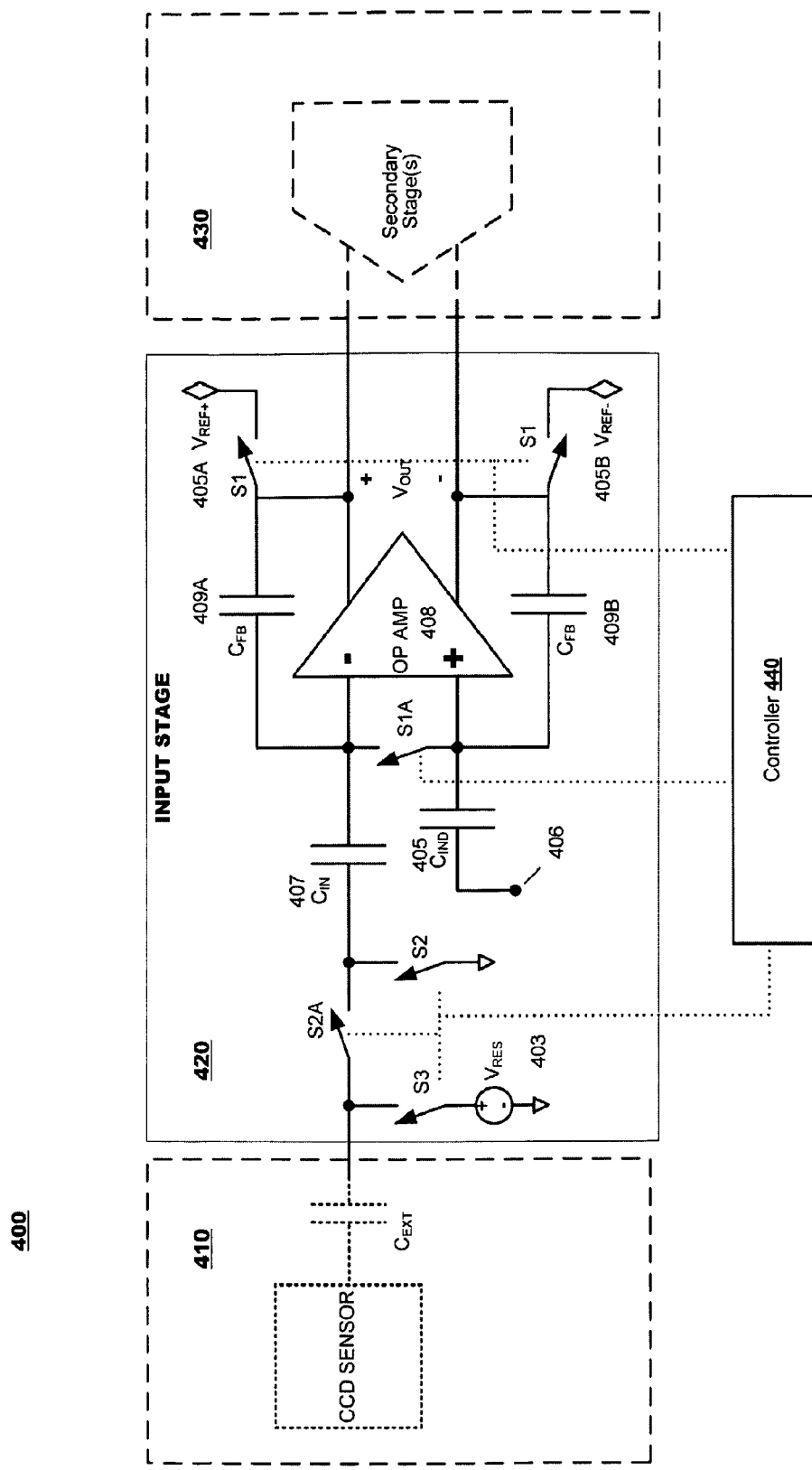
FIG. 4 illustrates another circuit according to another embodiment of the present invention.

Alternatively, a differential embodiment can also be implemented to provide equal gain to the differential inputs. FIG. 4 illustrates an imaging system 400 according to another embodiment of the present invention. The imaging system 400 of FIG. 4 comprises an image sensor 410, an input stage 420, an analog front end 430, and a controller 440.

Similar to the operation above with respect to FIG. 2, a differential, or double ended embodiment of input stage 400 also operates in two modes: a continuous time amplification mode and a sample and hold mode. Differences between the device 400 and device 200 include the addition of an additional output, an input capacitor $C_{IND}$ 405, feed back capacitors $C_{FB}$ 409A and 409B, and $V_{REF}$ 405A and 405B.

In the continuous time amplification mode, all of switches S1, S1A, S2 and S3 are open and switch S2A is closed. The operation of switches S1, S1A, S2, S2A and S3 are controlled according to the respective waveforms shown in FIG. 3 as labeled for the continuous time amplification mode. The external capacitor $C_{EXT}$ has been precharged to a fixed potential. Upon a determination by the controller 440 that image data, or main image data, is being output from the image sensor 410, the controller 440 outputs a continuous time amplification waveforms (such as those shown in FIG. 3) to control the operation of switches S1, S2, S2A and S3. The AC variations in the output from the CCD sensor propagate through the external capacitor $C_{EXT}$ into the input stage 420 to capacitor $C_{IN}$ 407.

The operation amplifier 408 has two inputs and two outputs. Of the two inputs, a first input receives the signal from $C_{IN}$ 407 and a second input receives a signal from capacitor $C_{IND}$ 405. Capacitor $C_{IND}$ 405 can provide a reference input signal obtained from a reference signal source applied to node 406. The operational amplifier 408 drives the difference between the AC signal received from $C_{IN}$ 407 at the first input and the AC signal received from $C_{IND}$ 405 at the second input to the output of the operational amplifier 408 with a gain. The gain is determined by the difference in the ratio of the value of capacitors $C_{IN}$ 407 and $C_{IND}$ 405 to the value of capacitors $C_{FB}$ 409B and $C_{FB}$ 409A. The output from the operational amplifier 408 is a differential mode output between the two outputs that can be delivered to secondary stages 430.

In sample and hold mode, the operation switches S1, S2, S2A and S3 is controlled by controller 440 according to the exemplary DC restore period waveforms shown in FIG. 3. The waveforms also influence the amount of charge on the external capacitor $C_{EXT}$ associated with image sensor 410 as it is charged through sample operations and hold operations.

In more detail, the reset operation can be started by the closing of switch S1A, which shorts the inputs of the operational amplifier 408 that pulls the output of the operational amplifier 408 to the difference between reference potential $V_{REF+}$ 405A and $V_{REF-}$ 405B, which is preferably substantially zero (0) volts.

According to the waveforms of FIG. 3, switch S2 opens, switch S2A closes and switch S3 closes. This performs a DC restore operation by resetting the charge on the capacitor $C_{EXT}$ to a predetermined potential determined by voltage source $V_{RES}$ 403. The DC restore operation is timed to coincide with readout operations from the dummy pixel array of the CCD.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method for controlling amplification of signals read from an imaging circuit, comprising:
   receiving first input signal representing variations in pixel values from the imaging circuit and second input signals representing fixed pixel values from the imaging circuit at an input;
   determining whether the received signals are first input signals or second input signals;
   based on a determination that the received signals are first input signals, actuating multiple switches to a first configuration in response to a set of first control signals;
   propagating, via a change from a first state of a first component to a second state, a signal representing the first input signals to an amplifier input, wherein the output of the amplifier is a continuous-time amplified signal;
   placing the multiple switches in a second configuration in response to a set of second control signals, wherein output of the set of second control signals is based on the determination that the received signals are second input signals;
   holding the second input signals at the first component when the set of second control signals place the multiple switches in a second configuration.

2. The method of claim 1, wherein the first input signal represents main image data read out from the main pixel array.

3. The method of claim 1, wherein the second input signal represents dummy image data from the dummy array.

4. The method of claim 1, wherein the first component is a capacitor.

5. The method of claim 4, wherein the capacitor is charged to a first state of charge based on the charge on an external capacitor.

6. The method of claim 1, wherein a second input of the amplifier is connected to a feedback capacitor, the feedback capacitor connected to an output of the amplifier.

7. The method of claim 1, wherein the second configuration of switches includes a closed switch between the inputs of the amplifier thereby minimizing the amplifier output.

8. The method of claim 1, wherein the second configuration of switches includes a switch that connects a voltage source to restore the charge on an external capacitor.

9. An system comprising:
   means for receiving first input signal representing variations in the pixel values and second input signals representing fixed pixel values of an imaging circuit at an input;
   means for determining whether the received signals are first input signals or second input signals;
   means for outputting, based on a determination that the received signals are first input signals, a first control signal, wherein multiple switches are oriented in a first configuration in response to the first control signal;
   means for propagating, via a change from a first state of a first component to a second state, a signal representing the first input signals to an amplifier input, wherein the output of the amplifier is a continuous amplified signal;
   means for placing the multiple switches in a second configuration in response to a second control signal, wherein output of the second control signal is based on the determination that the received signals are second input signals;
   means for holding the second input signals at the first component when the second control signal places the multiple switches in a second configuration.

10. The system of claim 9, wherein the first input signal represents main image data read out from the main pixel array.

11. The system of claim 9, wherein the second input signal represents dummy image data from the dummy array.

12. The system of claim 9, wherein the first component is a capacitor.

13. The system of claim 12, wherein the capacitor is charged to a first state of charge based on the charge on an external capacitor.

14. The system of claim 9, wherein a second input of the amplifier is connected to a feedback capacitor, the feedback capacitor connected to an output of the amplifier.

15. The system of claim 9, wherein the second configuration of switches includes a closed switch between the inputs of the amplifier thereby minimizing the amplifier output.

16. The system of claim 9, wherein the second configuration of switches includes a switch that connects a voltage source to restore the charge on an external capacitor.

* * * * *